US012261731B2

(12) United States Patent
Kwok et al.

(10) Patent No.: US 12,261,731 B2
(45) Date of Patent: Mar. 25, 2025

(54) AUTOMATED MANAGEMENT OF UPLINK TECHNOLOGIES FOR OPTIMAL EXPERIENCE

(71) Applicant: T-Mobile Innovations LLC, Overland Park, KS (US)

(72) Inventors: Ming Shan Kwok, Renton, WA (US); Wafik Abdel Shahid, Kenmore, WA (US); Mehmet Hinc, Snoqualmie, WA (US)

( * ) Notice: Subject to any disclaimer, the term of this patent is extended or adjusted under 35 U.S.C. 154(b) by 344 days.

(21) Appl. No.: 17/740,481

(22) Filed: May 10, 2022

(65) Prior Publication Data

US 2023/0370317 A1  Nov. 16, 2023

(51) Int. Cl.
*H04L 27/00* (2006.01)
*H04L 27/26* (2006.01)
*H04W 28/02* (2009.01)

(52) U.S. Cl.
CPC ...... *H04L 27/2646* (2013.01); *H04L 27/2607* (2013.01); *H04L 27/2636* (2013.01); *H04W 28/0257* (2013.01)

(58) Field of Classification Search
None
See application file for complete search history.

(56) References Cited

U.S. PATENT DOCUMENTS

| 10,523,358 | B1 | 12/2019 | Park et al. |
| 2018/0092095 | A1* | 3/2018 | Zeng ............... H04L 27/2666 |
| 2023/0275686 | A1* | 8/2023 | Shin ................. H04L 1/0026 370/329 |

FOREIGN PATENT DOCUMENTS

| WO | WO-2020133281 A1 * | 7/2020 | ........ H04W 72/1284 |
| WO | 2021/047973 A1 | 3/2021 | |

* cited by examiner

*Primary Examiner* — Gerald A Smarth
(74) *Attorney, Agent, or Firm* — Jones Robb, PLLC (57) ABSTRACT

Systems and methods are provided for centralized uplink technology control. A method includes receiving, over a network, from at least one wireless device, a capability report identifying wireless device uplink capabilities and determining uplink capabilities for the network. The method includes identifying matching network and wireless device uplink capabilities identifying radio frequency (RF) parameters for the wireless device and selecting an uplink technology for the wireless device from the matched network and wireless device uplink capabilities based on the RF parameters in order to optimize functionality of the wireless device.

20 Claims, 7 Drawing Sheets

AUTOMATED MANAGEMENT OF UPLINK TECHNOLOGIES FOR OPTIMAL EXPERIENCE

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs) and 5G NR next generation NodeBs (gNodeBs) or alternatively may be exclusively 4G or 5G cellular systems. The engine for driving 5G forward for fast growth and rapid adoption is its radio access technology, referred to as New Radio (NR). The flexibility and scalability of 5G NR makes it possible to introduce timely enhancements to address new use cases to help expand the 5G ecosystem and connect more and more devices to the network.

Wireless devices on 5G networks have access to an increasing number of uplink technologies. One example is NR support for different types of uplink waveform signals, which typically use orthogonal frequency division multiplexing (OFDM). For example, the different types of uplink waveforms include cyclic prefix (CP-OFDM) and discrete Fourier transform (DFT-s-OFDM). CP-OFDM is well-suited for maximizing a performance of spectral efficiency, e.g. in bits/Hz/s. Further, due to the user of inverse fast-Fourier transform (IFFT), CP-OFDM has a low complexity. CP-OFDM and DFT-s-OFDM provide various advantages and disadvantages. For example, CP-OFDM provides better throughput, but also causes power amplifier spikes at wireless devices transmitting uplink data, particularly for cell-edge wireless devices. DFT-s-OFDM provides a smoother power response in uplink signals for cell-edge wireless devices, but does not provide the higher throughput of CP-OFDM.

Other available uplink technologies for use in 5G NR networks include, for example 2×2 Multiple-Output (AMMO), which uses multiple transmitters and receivers to transfer more data at the same time and further allows. The possibility to switch between layers. Further, uplink (LTL) new radio (NR) carrier aggregation (CA) allows for changing from one carrier to two carriers. Additionally, 5G NR devices have more power classes which allow for a range of transmit powers. Another potentially available technology is sounding reference signal (SRS) antenna switching allowing changing between antennas. While all of these technologies have been developed, not all devices or networks support all of the technologies.

The current state of the art does not adequately leverage these available uplink technologies efficiently in order to provide maximum throughput and spectral efficiency based on existing RF conditions for impacted wireless devices. Accordingly, a solution is needed that maintains quality of service (QoS) and reliability for wireless devices and enhances uplink throughput and spectral efficiency by selectively implementing available uplink technologies based on wireless device RF conditions.

OVERVIEW

Exemplary embodiments described herein include systems, methods, and non-transitory computer readable mediums for optimizing wireless device uplink performance by selectively implementing an uplink technology. An exemplary method includes receiving, over a network, from at least one wireless device, a capability report identifying wireless device uplink capabilities. The method additionally includes determining uplink capabilities for the network and identifying matching network and wireless device uplink capabilities. The method further includes identifying radio frequency (RF) parameters for the wireless device and selecting an uplink technology for the wireless device from the matched network and wireless device uplink capabilities based on the RF parameters in order to optimize functionality of the wireless device.

An additional exemplary embodiment includes a centralized uplink technology controller for selectively implementing an uplink technology based on capabilities and conditions. The centralized uplink technology controller includes at least one processor executing instructions to perform multiple operations. The operations include determining both wireless device uplink capabilities a network uplink capabilities and identifying matching network and device uplink capabilities based on these determinations. The operations further include identifying radio frequency (RF) parameters for the wireless device and selecting an uplink technology for the wireless device from the matched network and device uplink capabilities based on the RF parameters in order to optimize wireless device functionality.

Yet an additional exemplary embodiment includes a non-transitory computer readable medium storing instructions executed by a processor to perform multiple operations. The operations include determining wireless device and network uplink capabilities and identifying matching network and device uplink capabilities based on the determination. The operations further include identifying radio frequency (RF) parameters for the wireless device and selecting an uplink technology for the wireless device from the matched network and device uplink capabilities based on the RF parameters in order to optimize wireless device functionality.

DETAILED DESCRIPTION

Exemplary embodiments described herein include systems, methods, and computer readable mediums for optimizing wireless device performance through automated uplink technology selection. In particular, embodiments set forth herein include enhanced logic for selecting an uplink technology based on network capabilities, wireless device capabilities, and RF parameters in order to optimize performance of the wireless devices and spectral efficiency of the network.

In embodiments provided herein, enhanced logic located at a base station dynamically selects one of more uplink technologies for a wireless device based on device capabilities and RF parameters. For example, the base station may facilitate selection by enabling, disabling, or switching uplink transmission technologies.

Thus, in embodiments set forth herein, an uplink technology controller is provided to dynamically select an uplink technology for a wireless device based on wireless device capabilities and RF conditions. Thus, for example, an uplink technology may be selected for the wireless device based on uplink signal strength, uplink signal to noise and interference ratio (SINR), uplink MIMO channel correlations, and/or uplink carrier availability. Accordingly, because RF conditions very by device location, wireless devices within a certain proximity to an access node may utilize different uplink technologies than wireless devices at a cell edge. Further, wireless devices located in an area with higher interference, such as in an area of overlapping coverage, may utilize a different technology than a wireless device in a region without significant interference.

In embodiments disclosed herein, an uplink technology controller may further evaluate the needs of a wireless device based on applications being utilized. For example, a guaranteed bit rate (GBR) application may utilize a different uplink technology than a non-GBR application. The uplink technology controller may determine that the GBR application has a low latency requirement that cannot be achieved by some of the available uplink technologies and that the non-GBR application does not have such a requirement.

Systems and methods disclosed herein evaluate the benefits of using various uplink technologies in particular situations. The uplink technologies, for example, include uplink 2×2 MIMO, waveform switching between CP-OFDM and DFT-s-OFDM, UL NR CA, changes between power classes, and SRS antenna switching. While previous selection of uplink technologies has been predetermined and hard coded for wireless devices, resulting in inefficient implementation, embodiments disclosed herein provide a centralized uplink technology controller for optimizing selection of wireless uplink technologies in different situations.

In addition to evaluating the capabilities of the wireless devices and the networks, the centralized uplink technology controller optimizes the technology based on RF conditions, often related to device location, and also based on applications running on the wireless devices and requirements of the applications. In performing the optimization, the centralized uplink technology controller identifies device capabilities as different devices may have support for different uplink features. The centralized uplink technology controller further considers network configuration or capability and harmonizes the wireless device capabilities and network capabilities to assign optimal uplink technologies at the different time and location of usage.

In embodiments disclosed herein, a cell or wireless network may be provided by an access node. The access node may utilize one or more antennas to communicate with wireless devices or UEs. Performance at a particular wireless device may be dependent on a number of factors including, for example, signal strength parameters and interference indicators. Values such as signal to interference and noise ratio (SINR), reference signal received power (RSRP), reference signal received quality (RSRQ) or other measurements may be periodically measured and reported by the wireless devices over a communication network to an access node. Additional signal performance parameters may be reported, including, for example, channel quality indicator (CQI), and rank index (RI). Further, wireless devices may send a UE capability report reflecting uplink technologies available to the wireless device. All of these factors may be considered during automated selection of an uplink technology for the wireless device.

In particular, embodiments disclosed herein include an improved method for maximizing network spectral efficiency and wireless device throughput by utilizing automated selection of an uplink technology. By selecting a particular uplink technology based on performance parameters of the wireless device, performance is maintained for wireless devices in the network. Other factors may also be considered as the performance of a wireless device may be dependent on a number of factors including, for example, antenna performance parameters, network loading conditions, and wireless device location within a cell or a sector.

Further, as described herein, switching between uplink transmission technologies may be based on a triggering event that may include detecting a signal strength meeting a predetermined threshold. For example, received signal received power (RSRP) or SINR at the wireless device may diminish to a level such that the connection is interrupted. However, when wireless devices move closer to an access node and no interference is present, the signal strength increases. When signal strength for a wireless device meets a predetermined network defined threshold, one uplink transmission mode may be enabled and another may be disabled. Further, parameters such as signal strength may be monitored on a continual basis, such that when the signal strength for the wireless device deteriorates, a different uplink transmission technology may be employed.

In embodiments set forth herein, the network may be a 4G LTE network 5G NR network or a combined 4G/5G network. Other networks are within scope of the disclosure. Wireless devices may travel throughout the network measuring and reporting performance parameters. Methods performed herein may be performed in response to the receipt and processing of measured performance parameters from the wireless devices. The access node, for example a gNodeB, may signal the wireless device and instruct it to completely disable one uplink transmission mode and enable an alternative uplink transmission mode.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, or gNodeB, and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for automated selection of uplink transmission technologies may be implemented as computer-readable instructions or methods and processing nodes on the network for executing the instructions or methods. The processing node may include a processor included in the access node or a processor included in any controller node in the wireless network that is coupled to the access node.

Figure 1:
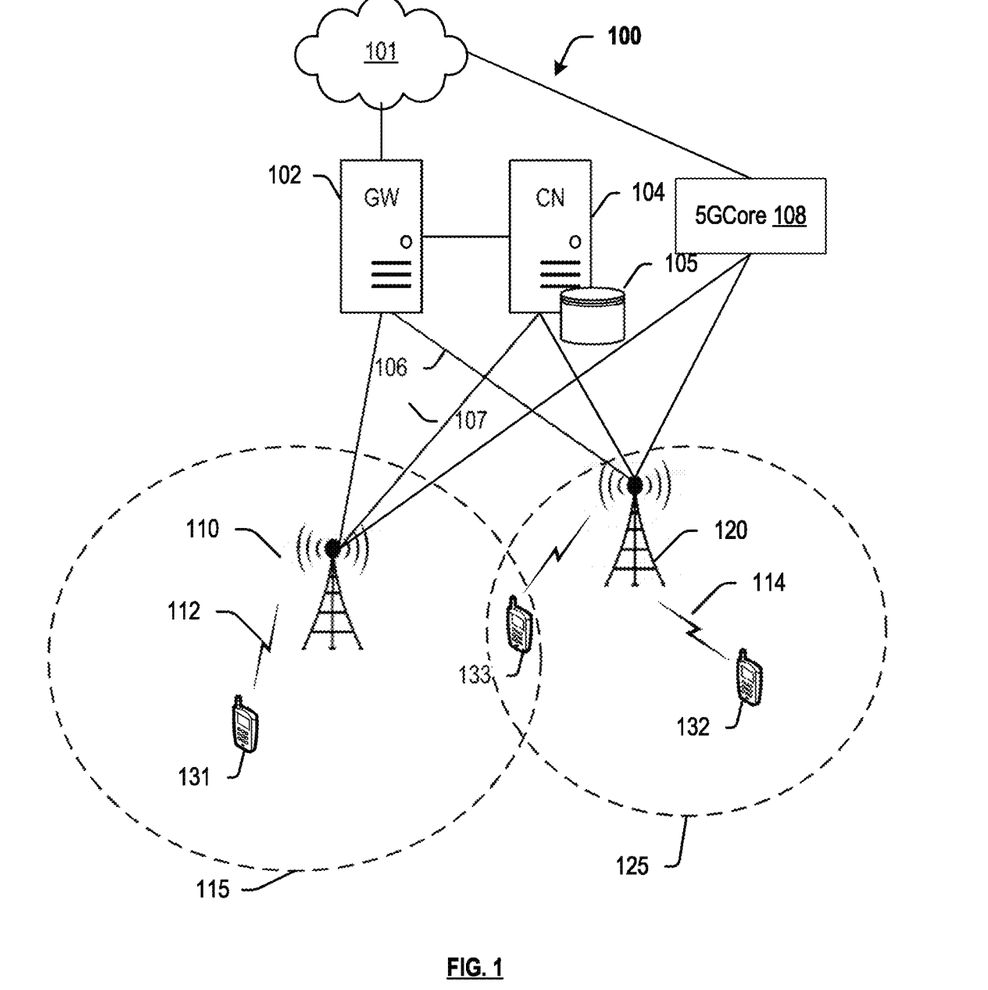
FIG. 1 depicts an exemplary system for wireless communication, in accordance with the disclosed embodiments.

FIG. 1 depicts an exemplary system 100 for use in conjunction with embodiments disclosed herein. System 100 comprises a communication network 101, gateway 102, controller node 104, 5G core 108, access nodes 110 and 120, and wireless devices 131, 132, and 133. Access node 110 is illustrated as having a coverage area 115, and access node 120 is illustrated as having a coverage area 125. As illustrated, the coverage area 115 may be larger than the coverage area 125. This may result from the access node 110 having higher power transmission capabilities than the access node 120. For example, the access node 120 may be capable of a 320 W downlink transmission power and the access node 120 may be capable of a 120 W downlink transmission power.

Wireless device 131 is located within coverage area 115 and accesses network services using a wireless communication link 112 from access node 110. Wireless device 132 is located within coverage area 125 and accesses network services from access node 120 via another wireless communication link 114. Further, wireless device 133 is located within overlapping coverage area formed by an overlap of coverage areas 115, 125. For example, access nodes 110, 120 may be configured to deploy individual sectors and the overlapping coverage area may comprise any overlapping coverage area of the sectors. The wireless devices 131, 132, and 133 may travel between the coverage areas 115 and 125, thus being variously connected to access nodes 110 and 120.

In the illustration of FIG. 1, both the first access node 110 and the second access node may be connected to the communication network 101 via both an LTE path (including the gateway node 102) and an NR path (including the 5G core 108). However, in practical implementations one or both of the first access node 110 and the second access node 120 may be connected to the communication network 101 via only a single RAT path. In any event, the first access node and the second access node 110, 120 communicate with the gateway node 102, the controller node 104, and/or the 5G core 108 via respective communication links, each of which may be a direct link (e.g., an X2 link or the like).

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, gNodeBs, eNodeBs, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small access node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path-including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as location information for overlapping coverage area 135, positions of wireless devices 131, 132, 133, transmission power capabilities, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Further, a scheduling entity (within, for example, one or both of access nodes 110, 120, or controller node 104) may be configured to allocate resources and select an uplink technology in accordance with embodiments set forth herein, thereby improving wireless device performance and network spectral efficiency throughout the coverage area.

The core 108 may be a 5G core collectively implementing several control plane network functions (NFs) and user plane NFs. The control plane NFs include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The user plane NFs include but are not limited to a Unified Data Repository (UDR) and a UPF. Control plane NFs can provide one or more NFs based on a request-response or subscribe-notify model. The NFs may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 108. To use other network functions, registered functions can send service requests to the NRF.

The UDM interfaces with NFs such as AMF and SMF so that relevant data becomes available to AMF and SMF. The UDM generates authentication vectors when requested by the AUSF, which acts as an authentication server. The AMF performs the role of access point to the 5G core 108, thereby terminating RAN control plane and UE traffic originating on either the N1 or N2 reference interface. In the 5G core 108, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
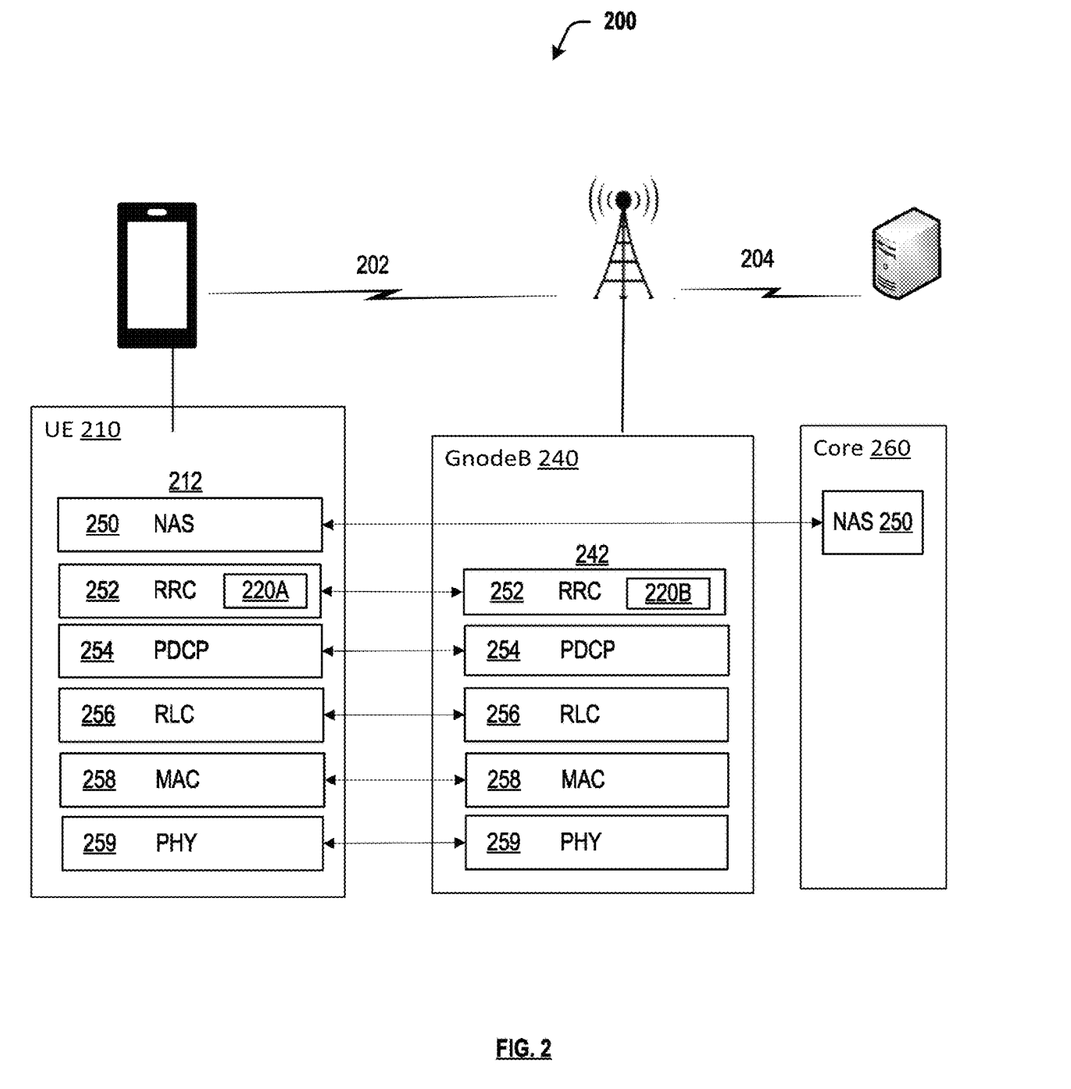
FIG. 2 illustrates an exemplary configuration of an environment for an uplink technology controller in accordance with disclosed embodiments.

FIG. 2 illustrates an exemplary environment for an uplink technology selection controller 220a, 220b in accordance with disclosed embodiments. A wireless device 210 communicates over a communication link 202 with an access node 240, which may, for example be gNodeB. Wireless device 210 and gNodeB 240 communicate over a communication link 204 with a core network 260, which may include a service based architecture as described above.

The wireless device 210 and the gNodeB 240 may implement protocol stacks 212 and 242 respectively in a control plane. The protocol stack is a set of protocols used in a communications network and includes a hierarchy of software layers residing in each client and server. In the illustrated embodiments, a non-access stratum (NAS) layer 250 sits on top of the UE protocol stack 212 and is used to manage the establishment of communication sessions and for maintaining continuous communications with the user equipment as it moves. The NAS layer 250 on top of the TIE protocol stack 212 maps to a NAS layer 250 in the core network 260.

Below the NAS layer in the LTE protocol stack 212 is a radio resource control (RRC) layer 252. The automated uplink technology controller 220 may reside in the RRC layer 252 at both the wireless device 210 (as 220A) and the gNodeB 240 (as 220B). The RRC layer 252 exists only in the control plane in the UE 210 and in the gNB 240.

Below the RRC layer 252 in both the UE control plane protocol stack 212 and the gNB control plane protocol stack 242 is a packet data convergence protocol (PDCP) layer 254 is on top of the protocol stack. A radio link control (RLC) layer 256 sits below the PDCP layer 254. A media access control (MAC) layer 258 sits below the RLC layer 256 and a physical (PHY) layer 259 sits below the MAC layer 258.

The PHY layer 259 provides services to the MAC layer 258 and supports downlink (gNodeB-to-UE), uplink (LTE-to-gNodeB) and side link (UE-to-HE) communications. As set forth above, embodiments of the uplink technology controller 220a 220b disclosed herein, reside in the RRC layer 252 of the UE protocol stack 212 and the gNB protocol stack 242.

Figure 3:
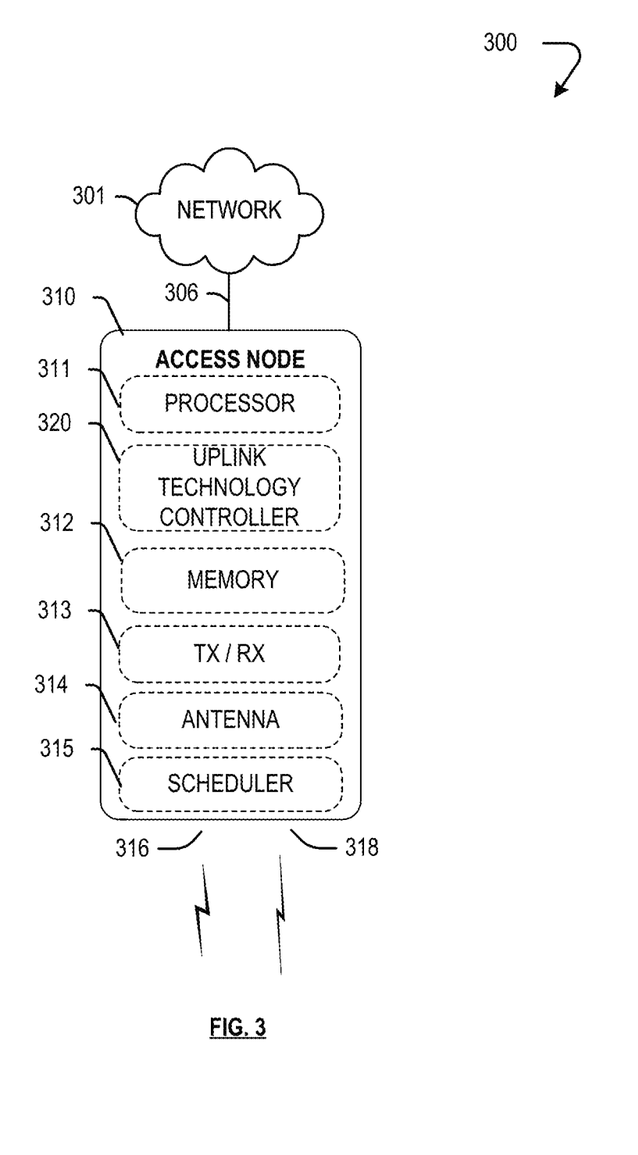
FIG. 3 depicts an access node in accordance with disclosed embodiments.

FIG. 3 depicts an environment 300 for an access node 310 in accordance with the disclosed embodiments, which may correspond to any of the access nodes 110, 120, and 240 illustrated in FIGS. 1 and 2. In exemplary embodiments, access node 310 can include, for example, a gNodeB. Access node 310 may comprise, for example, a macro-cell access node, such as access nodes 110 or 120 described with reference to FIG. 1. Access node 310 is illustrated as comprising a processor 311, memory 312, transceiver(s) 313, antenna(s) 314, scheduler 315 and uplink technology controller 320. Processor 311 executes instructions stored on memory 312, while one or more transceivers 313 and antennas 314 enable wireless communication with other network nodes, such as wireless devices and other nodes.

The uplink technology controller 320 may be or include a separate component as shown or may comprise instructions store in memory 312 and executed by the processor 311. The uplink technology controller 320 may communicate with wireless devices, for example over one or more communication links 316 and 318, which may correspond to one or more RATs, to execute uplink technology selection as will be further described below.

Further, the transceivers 313 and antennas 314 receive signals from the mobility entity such as an MME or AMF and pass the messages to the appropriate wireless device. Scheduler 315 may be provided for scheduling resources, including those related to selection of uplink technology based on the presence and performance parameters of the wireless devices. Network 301 may be similar to network 101 discussed above.

In embodiments provided herein, the uplink technology controller 320 may operate to compare network uplink technology capabilities with specific uplink technology capabilities for wireless devices within the network. For example, while support for waveform switching in wireless devices is standard, many wireless devices do not support 2×2 MIMO. Therefore, the uplink technology controller 320 will compare the capabilities of the network and wireless devices and identify matching capabilities. Further, the uplink technology controller 320 will identify RF parameters experienced by the wireless device. These parameters can be identified, for example, by direct measurement, or alternatively by evaluation of periodically received or requested UE capability reports.

The uplink technology controller 320 may store and execute an algorithm to maximize wireless device throughput and/or network spectral efficiency by selection of one or more uplink technologies based on identification of the matching uplink technologies and the RF parameters. The RF parameters may include, for example, uplink signal strength, uplink SINR, uplink MIMO channel correlations, and uplink carrier availabilities. The uplink technologies may include, for example, 2×2 MIMO, waveform switching, NR carrier aggregation, changes between power classes, and SRS antenna switching.

In embodiments provided herein, execution of the algorithm may provide a trigger for enabling one or more uplink technologies and disabling other uplink technologies. In embodiments provided herein, the access node 310 may send instructions to the wireless device regarding enabling or disabling specific uplink technologies in order to maximize network spectral efficiency and/or maximize wireless device throughput. The access node 310 may then utilize transceivers 313 and antennas 314 to send an instruction to the wireless device in order to enable or disable selected technologies.

Figure 4:
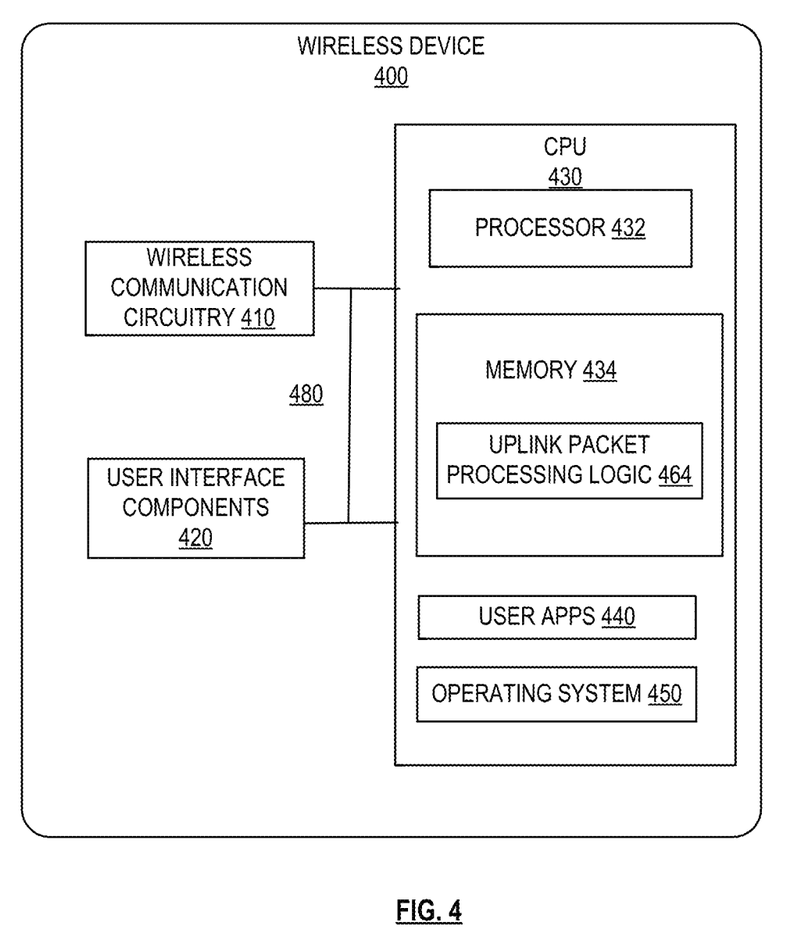
FIG. 4 is a block diagram illustrating a wireless device in accordance with embodiments disclosure herein.

FIG. 4 depicts a wireless device (UE) 400 in accordance with disclosed embodiments. The wireless device may correspond to one of wireless devices 131, 132, and 133 in FIG. 1 or wireless device 210 in FIG. 2. As illustrated, the wireless device 400 includes wireless communication circuitry 410, user interface components 420, a central processing unit (CPU) 430, processor 432, memory 434, user apps 440, and operating system 450. Components may be connected, for example, by a bus 480. These components are merely exemplary and the wireless device 400 may include a larger or smaller number of components capable of performing the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 434 may store uplink packet processing logic 464. The uplink packet processing logic 464 may include programming, that when executed by the processor 432 initiates and performs the uplink technology selection procedures described further herein with reference to FIGS. 5 and 7. In embodiments set forth herein, the uplink packet processing logic 464 may correspond to, or operate in conjunction with uplink technology controller component 220A shown in FIG. 2. While the access node uplink technology controller may perform actually selection, logic on the wireless device 400 assists the access node by providing information necessary for selection of an uplink technology.

The wireless communication circuitry 410 may include circuit elements configured to generate wireless signals (e.g., one or more antennas) as well as interface elements configured, for example, to translate control signals from the CPU 430 into data signals for wireless output. Further, the wireless communication circuitry 410 may include multiple elements, for example to communicate in different modes with different RATs. The CPU 430 may be configured to receive, interpret, and/or respond to signals received via the wireless communication circuitry 410. The CPU 430 may be configured to receive a network command (e.g., from an access node such as the access nodes 110, 120, 240) and, in response thereto, to join the network in a particular RAT or to switch from one RAT to another or perform other specified functions. As noted herein, this wireless device is merely exemplary, as different wireless devices may have differing uplink technology transmission capabilities.

The wireless device 400 may belong to a power class, and may for example be a low power UE (LPUE) or a high power UE (HPUE). An LPUE may not successfully transmit to an access node in a heavily loaded network, whereas an HPUE in the same location may have sufficient transmit power to continue to transmit to the access node. Alternatively, in another exemplary embodiment, HPUEs and LPUEs can be configured with a chipset type or version, which may be provided to the access node by the HPUEs or LPUEs during an ATTACH PROCEDURE. Other methods of communicating whether the UE is a HPUE or LPUE may be used in conjunction with the disclosed embodiments. Accordingly, a processor or processing node may determine if a wireless device interacting with the access node is an HPUE or an LPUE.

Figure 5:
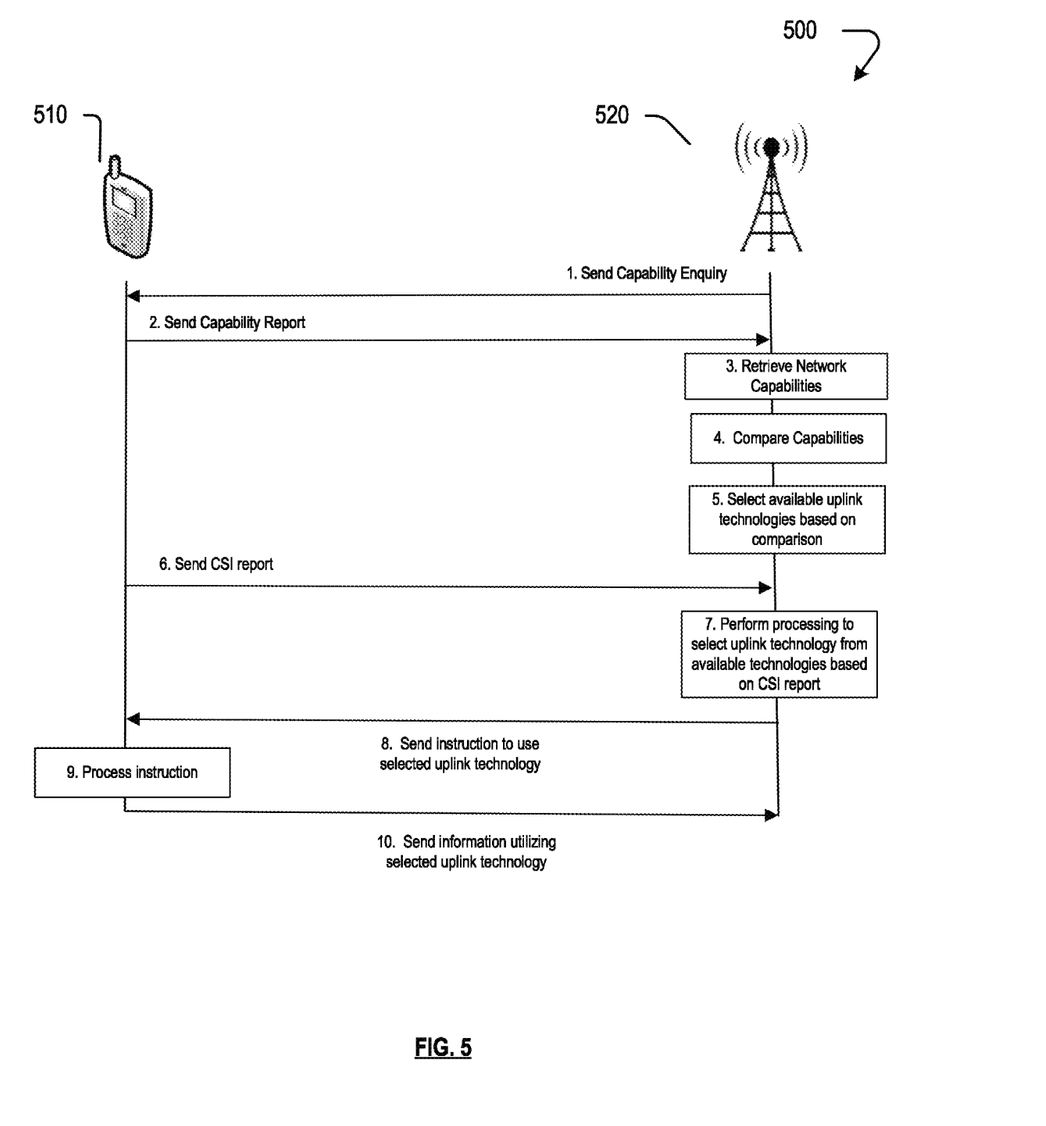
FIG. 5 flow diagram depicting an access node and wireless device selecting an uplink technology in accordance with disclosed embodiments.

FIG. 5 is a flow diagram 500 further illustrating interaction between a wireless device 510 and an access node 520 in accordance with embodiments described herein. In step 1, the access node 520 sends a UE capability enquiry to the wireless device 510. In embodiments set forth herein, the uplink technology controller of access node 520 may formulate a specific enquiry requesting uplink technology capabilities of the wireless device. The UE capability enquiry may occur at the time of UE registration and before the LYE would be able to perform data transfer or make or receive voice calls, so that the access node 520 can understand. LT capabilities and configure the UE accordingly. In embodiments disclosed herein, the UE capability report specifies uplink 2×2 MIMO capabilities, waveform capabilities (CP-OFDM and/or DFT-s-OFDM), uplink HR carrier aggregation, UE power classes, and antenna switching capabilities.

In step 2, in response to the enquiry wireless device sends a UE capability report to the access node 520. The access node 520 may store the LE capabilities locally, including the uplink technology capabilities to avoid the need for requesting the capabilities every time an RRC connection is established or re-established. However, the access node 520 can request the UE 510 to send its capabilities at any time during RRC connected state. Additionally, if the UE 510 changes its radio capabilities, it can initiate a tracking area update procedure including an indication that capability update information is needed. The access node 520 would then request new UE capabilities from the UE 510.

In step 3, the access node 520 retrieves network uplink technology capabilities from a database or from the core network. In step 4, the access node 520 compares the retrieved network uplink capabilities to the received UE uplink capabilities from step 2. In step 5, the access node 520 determines available uplink technologies based on the comparison.

In step 6, the UE 510 sends measurement report including performance parameter to the access node 520. The measurement report may, for example, be a channel state information (CSI) report including RF parameters. The RF parameters may include for example, uplink signal to noise and interference ratio (SINR), uplink signal strength, uplink MIMO channel correlations, and uplink carrier availability. The CSI report may include additional parameters such as a channel quality indicator (CQI), a precoding matrix index (PMI), and a rank indicator (RI), CSI-RS Resource Indicator (CRI), SS/PBCH Resource Block Indicator (SSBRI), and layer indicator (LI). In order to avoid prolonged decreases in QoS or other performance parameters, wireless devices periodically send channel status information (CSI) reports to an access node in the network. The CSI report tells the access node how good or bad a channel is at a specific time.

In step 7, based on the CSI report, the access node 520 processes the received and retrieved information to select one or more uplink technologies for use by a particular UE 510. For example, access to high data speeds is improved if a high signal to interference and noise ratio (SINR) is present. Accordingly, when a wireless device moves further from an antenna, the wireless device is likely to experience a decrease in quality of service (QoS). Some uplink technologies have a wider range (e.g. high power class) than others and therefore, one or more technologies with a wider range may selected when low SINR measurements are received. If the wireless device moves closer to the access node 520, the SINR may be higher and a different technology maximizing throughput for the wireless device may be selected. In further embodiments, the access node 520 may also consider the application running on the wireless device when selecting one or more uplink technologies and maximizing throughput and spectral efficiency. For example, some applications may have a guaranteed bit rate (GBR) requirements, while other applications do not. Thus, the access node 520 may consider whether the application is a GBR application, such as, for example, video-over-IP (ViIP), voice-over-IP (VoIP), video-over-LTE (ViLTE), voice-over-LTE (VoLTE), or control transmissions or a non-GBR application, such as, for example, multimedia streaming, background data, or any other transmissions that are not associated with a GBR or a minimum quality of service (QoS). The type of transmission can be determined based on a QoS identifier, and the QoS identifier can be associated with a latency requirement of the transmission. In an exemplary embodiment, the QoS identifier comprises a QoS flow identifier (QFI).

Because different uplink features have different criteria for decisions, a centralized uplink technology controller of the access node 520 reviews the spectrum being used for allowing uplink CA and determines, for example, a channel correlation for both MIMO efficiency and also waveform efficiency. The uplink technology controller of the access node 520 may make some determinations based on device location. For example, with respect to waveform switching, a wireless device located centrally (near the access node 520) may operate more efficiently using CP-OFDM and a wireless device at the cell edge may operate more efficiently using DFT-s-OFDM. However, the centralized uplink technology controller may also evaluate CA and MIMO based on device reports of channel correlation, channel quality, spectrum, channel bandwidth for one frequency versus another. Further, uplink CA efficiency is tied to uplink power on a primary cell vs. a secondary cell and the centralized uplink technology controller evaluates these factors.

Further, the centralized uplink technology controller of the access node 520 can evaluate at what point, e.g., threshold SINR or device location, would MIMO provide better throughput and spectral efficiency than CA and vice versa. At this point, the centralized uplink technology controller of the access node 520 could instruct the wireless device to switch uplink technologies. For example, the scheduler 315 of the access node 310 may provide instructions for switching technologies at the determined point. Alternatively, if the RF conditions for a wireless device indicate that uplink CA is consistently better than MIMO, regardless of device location, than the centralized uplink technology controller of the access node 520 may instruct the wireless device 510 to utilize uplink CA regardless of wireless device location.

In addition to optimizing throughput, the centralized uplink technology controller of the access node 520 may also optimize the selection of uplink technologies to minimize uplink interference. Accordingly, when the wireless device 510 is moving to cell edge, the centralized uplink technology controller may evaluate necessary throughput based on wireless device application. For example, different applications, such as voice over new radio (VoNR) or voice over long term evolution (VoLTE) have minimal throughput requirements.

Accordingly, the centralized uplink technology controller implements intelligence in the form of a decision tree. The decision tree first assesses capabilities and then evaluates the possible uplink technologies based on RF conditions. In some instances, a wireless device 510 may be incapable of supporting multiple technologies. For example, the wireless device 510 may not support 2×2 MIMO. In this instance, the centralized uplink technology controller of the access node 520 determines which waveform switching technology maximizes throughput for the wireless device 510, e.g., based on RF parameters and/or wireless device location. For example, the centralized uplink technology controller of the access node 520 may evaluate CP-OFDM and DFT-s-OFDM for the device. While CP-OFDM provides more spectral efficiency, the centralized uplink technology controller will estimate the maximum throughput for the two technologies. In the cell center, the centralized uplink technology controller may instruct the wireless device to utilize CP-OFDM because of high spectral efficiency. In selecting between uplink CA and MIMO, the centralized uplink technology controller of the access node 520 may calculate maximum throughput that can be achieved using each technology. While MIMO improves data rates through smart antenna technology, carrier aggregation makes the best use of available frequency carriers.

With respect to power classes, some wireless devices may have the capability to switch between power classes. Thus, As a further example, the access node 520 may choose an uplink technology based on power class capabilities. The power class of a wireless device defines the maximum transmit power over NR channel bandwidth. Low transmit power from a wireless device provides a limited uplink budget and limits cell range. Higher wireless device transmit powers enable the wireless device to signal the access node 520 effectively from a longer distance.

With respect to sounding reference signal (SRS) antenna switching, SRS is a reference signal which is transmitted by the UE 510 to the access node 520. SRS gives information about the combined effect of multipath fading, scattering, Doppler, and power loss of transmitted signal. The antenna switching capability indicates a number of RX antenna ports of the UE 510. The access node 520 schedules a number of SRS resource sets for the wireless device 510 based at least in part on the number of RX antenna ports in excess of four. For example, the number of RX antenna ports may be equal to 8.

In the scenario described herein, the wireless device 510 may, for example, be moving closer to the access node 520. Thus, at a location close to the access node 520, the wireless device 510 may send a performance parameter that meets a predetermined threshold. Thus, in selecting the uplink technology in step 7, the access node 520 may determine the particular needs of the wireless device base on its location and application. Accordingly, the instruction of step 8 may inform the wireless device 510 the wireless device 510 to utilize a specific uplink technology, such as, for example, CP-OFDM for spectral efficiency and UL carrier aggregation if it provides greater throughput than MIMO or if MIMO is not available. However, when the wireless device 510 is further from the access node 520 or in an area with interference from a neighboring cell, the performance parameters measured by the wireless device 510 may be less favorable. In this case, the access node 520 may provide a different instruction, such as by instructing the wireless device to utilize DFT-s-OFDM. Accordingly, the procedure described herein may allow the wireless device 510 to use a variety of uplink transmission technologies in order to maximize throughput and/or optimize network spectral efficiency.

Figure 6:
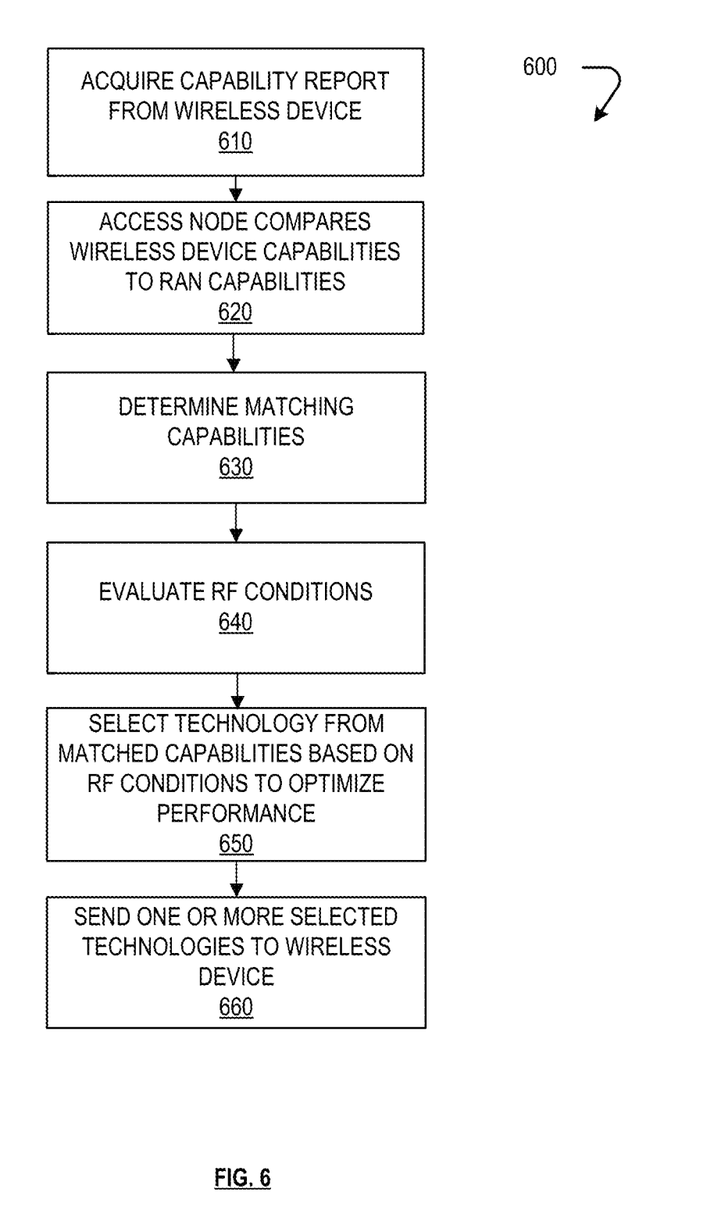
FIG. 6 is a flow chart depicting a method for selecting an uplink technology in accordance with disclosed embodiments.

The disclosed methods for selecting an uplink technology are further described with reference to FIGS. 6 and 7 below. FIG. 6 illustrates an exemplary method 600 for selecting an uplink technology in order to maximize wireless device throughput and/or network spectral efficiency.

Method 600 may be performed by any suitable processor discussed herein, for example, the processor 311 included in the access node 310 or a processor included in a controller node. For the sake of convenience, the method is described as being performed by the access node 520. Although only one wireless device 510 is shown as interacting with the access node 520, it should be understood that the access node 520 interacts with multiple wireless devices, such as, for example wireless devices 131, 132, and 133.

Method 600 starts in step 610 when the access node 520 acquires a capability report from the wireless device 510. As set forth above with respect to FIG. 5, the access node 520 may send a capability enquiry in order to compel the wireless device 510 to send the capability report or alternatively may receive the capability report periodically, during a tracking update procedure, or during and RRC connection request. The capability report may include specific uplink technology capabilities of the wireless device. For example, the capability report may indicate whether the device is capable of multiple waveform technologies such as uplink 2×2 MIMO, is capable of switching waveforms between CP-OFDM and DFT-s-OFDM, and is capable of changing between two carriers using UL NR CA. The capability report may further indicate a power class of the device and whether the device is capable of switching between power class 1.5 and power class 2, for example. Further, the capability report may indicate whether the wireless device 510 utilizes multiple antennas and is capable of SRS antenna switching.

In step 620, the access node 520 compares the wireless device capabilities to RAN capabilities. The access node 520 may, for example, retrieve RAN capabilities from a database and compare them to the UE capabilities received through the aforementioned report.

In step 630, the access node 520 determines matching capabilities between the wireless device 510 and the network. As explained herein, wireless devices have differing capabilities and therefore multiple different determinations of matching capabilities can be made depending upon the particular wireless device reporting.

In step 640, the access node 520 evaluates RF conditions for the wireless device. For example, the access node 520 may receive a CSI report pertinent to RF conditions for the wireless device 510. When possible, the access node 520 may make direct measurements of RF conditions for the wireless device. It should be noted that the order of steps 610-640 is merely exemplary and that the steps may be performed in various alternative orders.

In step 650, the access node 520 executes an algorithm as explained herein to select an uplink technology based on the RF conditions and the matched uplink capabilities. In step 660, the access node 520 sends an instruction to the wireless device 510 including the one or more selected uplink technologies for utilization in order to maximize wireless device throughput and/or maximize network spectral efficiency. In embodiments described herein, the instruction may cause one or more uplink technologies to become disabled and may cause other uplink technologies to become enabled.

Accordingly, in the embodiment described with respect to FIG. 6, uplink technologies are selected by the access node 520 and conveyed to the wireless device 510 by instruction. The wireless device is able to utilize a selected technology in order to maximize wireless device throughput and/or maximize network spectral efficiency.

Figure 7:
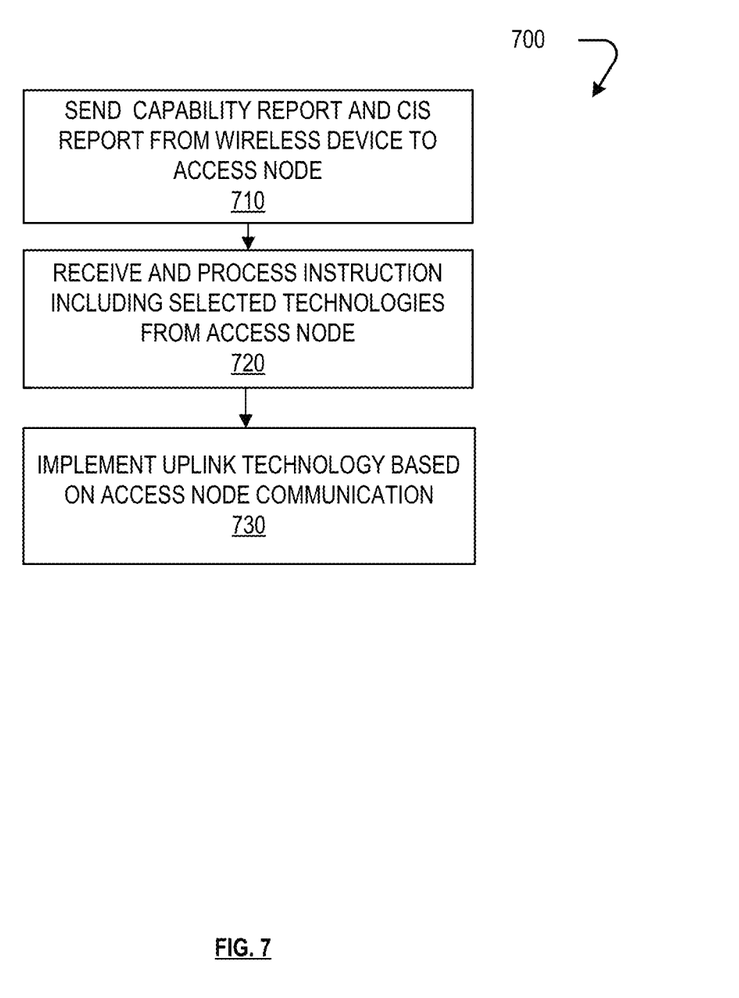
FIG. 7 is a flow chart depicting an additional method for selecting an uplink technology in accordance with disclosed embodiments.

FIG. 7 illustrates a method 700 for uplink technology selection in accordance with disclosed embodiments. The method 700 may be performed by a wireless device, for example by the processor 432 and/or uplink technology processor 464 of the wireless device 400. For the sake of illustration, the method is described as being performed by the wireless device 400.

In step 710, the wireless device 510 sends a capability report and CSI report from the wireless device 510 to the access node 520. As explained above, the capability report provides a list of uplink technology capabilities of the wireless device 510. The CSI report includes RF parameters measured or determined by the wireless device. Thus, in embodiments set forth herein, the access node 520 may receive the measured performance parameter from the wireless device 510. However, in other embodiments, the access node 520 may perform its own measurements or retrieve stored measurements.

In step 720, the wireless device 510 receives and processes an uplink technology instruction from the access node 520. As explained above, the access node 520 formulates the uplink technology instructions by evaluation of network uplink technology capabilities, wireless device uplink technology capabilities, and RF conditions for the wireless device. Finally, in step 730, the wireless device 510 selects one or more uplink technologies based on the instruction received from the access node in step 720.

In some embodiments, methods 600 and 700 may include additional steps or operations. Furthermore, the methods may include steps shown in each of the other methods. As one of ordinary skill in the art would understand, the methods 700 and 800 may be integrated in any useful manner and the order of steps may be altered as appropriate.

By the methods described herein, wireless device performance can be improved by utilizing an uplink technology controller to selectively implement uplink technologies in order to optimize network spectral efficiency and maximize wireless device throughput.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    receiving, over a network, from at least one wireless device, a capability report identifying wireless device uplink capabilities;
    determining uplink capabilities for the network;
    identifying matching network uplink capabilities and wireless device uplink capabilities;
    receiving a channel state information (CSI) report from the wireless device identifying radio frequency (RF) parameters for the wireless device;
    evaluating the RF parameters for the wireless device based on the CSI report; and
    selecting an uplink technology for the wireless device from the matching uplink capabilities for the network and the wireless device based on the RF parameters for the wireless device in order to optimize functionality of the wireless device by maximizing throughput for the wireless device and in order to maximize network spectral efficiency.

2. The method of claim 1, further comprising determining a threshold signal-to interference-plus-noise ratio (SINR) at which multiple in multiple out (MIMO) provides greater spectral efficiency than carrier aggregation.

3. The method of claim 2, further comprising instructing the wireless device to switch from carrier aggregation to MIMO at the threshold SINR.

4. The method of claim 1, wherein the matching uplink capabilities include at least waveform uplink capabilities allowing switching between CP-OFDM and DFT-s-OFDM.

5. The method of claim 4, wherein the matching uplink capabilities further comprise MIMO uplink capabilities allowing changing between two layers.

6. The method of claim 4, wherein the matching uplink capabilities further comprise carrier aggregation allowing two carrier uplink.

7. The method of claim 4, wherein the matching uplink capabilities further comprise at least one of sounding reference signal (SRS) antenna switching and switching between power classes 1.5 and 2.

8. The method of claim 1, wherein the RF parameters include at least one of uplink signal strength, uplink signal and interference to noise ratio (SINR), uplink MIMO channel correlations, and uplink carrier availability.

9. The method of claim 1, further comprising determining an application in use by the wireless device, determining if the application requires a guaranteed bit rate (GBR), and further selecting the uplink technology based on whether the application requires a GBR.

10. A centralized controller comprising:
    at least one processor executing instructions to perform multiple operations including:
        determining wireless device uplink capabilities;
        determining network uplink capabilities;
        identifying matching network uplink capabilities and wireless device uplink capabilities;
        receiving a channel state information (CSI) report from the wireless device identifying radio frequency (RF) parameters for the wireless device;
        evaluating the RF parameters for the wireless device based on the CSI report; and
        selecting an uplink technology for the wireless device from the matching network uplink capabilities and device uplink capabilities based on the RF parameters for the wireless device in order to optimize wireless device functionality by maximizing throughput for the wireless device and in order to maximize network spectral efficiency.

11. The controller of claim 10, the operations further comprising determining a threshold signal-to interference-plus-noise ratio (SINR) at which multiple in multiple out (MIMO) provides greater spectral efficiency than carrier aggregation.

12. The controller of claim 11, the operations further comprising instructing the wireless device to switch from carrier aggregation to MIMO at the threshold SINR.

13. The controller of claim 10, wherein the matching uplink capabilities include waveform uplink capabilities allowing switching between CP-OFDM and DFT-s-OFDM.

14. The controller of claim 13, wherein the matching uplink capabilities further comprise at least one of MIMO uplink capabilities allowing changing between two layers, carrier aggregation allowing two carrier uplink, sounding reference signal (SRS) antenna switching, and switching between power classes 1.5 and 2.

15. The controller of claim 10, wherein the RF parameters include at least one of uplink signal strength, uplink signal and interference to noise ratio (SINR), uplink MIMO channel correlations, and uplink carrier availability.

16. The controller of claim 10, further comprising determining an application in use by the wireless device, determining if the application requires a guaranteed bit rate (GBR), and further selecting the uplink technology based on whether the application requires a GBR.

17. A non-transitory computer readable medium storing instructions executed by a processor to perform multiple operations comprising:
    receiving, over a network, from at least one wireless device, a capability report identifying wireless device uplink capabilities;
    determining wireless device uplink capabilities from the capability report;
    determining network uplink capabilities;
    identifying matching network uplink capabilities and wireless device uplink capabilities;
    receiving a channel state information (CSI) report from the wireless device identifying RF parameters for the wireless device;
    evaluating the RF parameters for the wireless device based on the CSI report; and
    selecting an uplink technology for the wireless device from the matching network uplink capabilities and device uplink capabilities based on the RF parameters for the wireless device in order to optimize wireless device functionality by maximizing throughput for the wireless device and in order to maximize network spectral efficiency.

18. The non-transitory computer readable medium of claim 17, the operations further comprising determining a threshold signal-to interference-plus-noise ratio (SINR) at which multiple in multiple out (MIMO) provides greater spectral efficiency than carrier aggregation.

19. The non-transitory computer readable medium of claim 18, the operations further comprising instructing the wireless device to switch from carrier aggregation to MIMO at the threshold SINR.

20. The non-transitory computer readable medium of claim 17, wherein the matching uplink capabilities include waveform uplink capabilities allowing switching between CP-OFDM and DFT-s-OFDM.

* * * * *